US009730428B1

(12) United States Patent
Kreischer et al.

(10) Patent No.: US 9,730,428 B1
(45) Date of Patent: Aug. 15, 2017

(54) POP UP MOUSE CAT TOY

(71) Applicant: OurPet's Company, Fairport Harbor, OH (US)

(72) Inventors: Brian Kreischer, Fairport Harbor, OH (US); Steven Tsengas, Fairport Harbor, OH (US)

(73) Assignee: OURPET'S COMPANY, Fairport Harbor, OH (US)

( * ) Notice: Subject to any disclaimer, the term of this patent is extended or adjusted under 35 U.S.C. 154(b) by 27 days.

(21) Appl. No.: 14/605,824

(22) Filed: Jan. 26, 2015

Related U.S. Application Data

(60) Provisional application No. 61/944,672, filed on Feb. 26, 2014.

(51) Int. Cl.
*A01K 15/02* (2006.01)

(52) U.S. Cl.
CPC .................. *A01K 15/025* (2013.01)

(58) Field of Classification Search
CPC ..... A01K 15/02; A01K 15/021; A01K 15/025
USPC ......... 119/707, 702, 706; 446/330–332, 352, 446/365
See application file for complete search history.

(56) References Cited

U.S. PATENT DOCUMENTS

| | | | | |
|---|---|---|---|---|
| 2,334,656 A | * | 11/1943 | Thomas | A63F 9/14 446/332 |
| 4,224,761 A | * | 9/1980 | Wakimura | A63H 13/02 273/237 |
| 4,790,532 A | * | 12/1988 | Chen | A63F 9/305 273/140 |
| 4,936,574 A | * | 6/1990 | Lee | A63F 9/305 273/447 |
| 5,542,376 A | * | 8/1996 | Udelle | A01K 15/025 119/707 |
| 5,579,725 A | * | 12/1996 | Boshears | A01K 15/025 119/706 |
| 5,752,704 A | * | 5/1998 | Todokoro | A63F 9/30 273/447 |
| 5,875,736 A | * | 3/1999 | Udelle | A01K 15/025 119/706 |
| 6,164,653 A | * | 12/2000 | Chuang | A63H 13/02 273/109 |
| 6,591,785 B1 | * | 7/2003 | Boshears | A01K 15/024 119/706 |
| 2009/0095229 A1 | * | 4/2009 | Plante | A01K 15/025 119/707 |

(Continued)

*Primary Examiner* — Trinh Nguyen
(74) *Attorney, Agent, or Firm* — John D Gugliotta

(57) ABSTRACT

A generally circular enclosure is provided defining a generally circular track about which a prey decoy is located and travels. Openings or apertures in its housing permitting the prey decoy to travel about the track. The prey decoy is secured to a rotating wheel that imparts a rotary motion about the circular shaped track. The prey decoy is further spring urged in a vertical direction, perpendicular to the plane of rotational motion. The track opening has at least one break, making it noncontiguous. As the decoy is deployed about the track and impinges against the housing at the break in the track, the decoy is urged downward, and subsequently is urged upward when it reaches the track opening at the opposing side of the break. This circular motion in which the prey decoy appear to be moving upward and downward as it travels about the circular path stimulates the animal to paw at and engage the prey.

8 Claims, 6 Drawing Sheets

(56) References Cited

U.S. PATENT DOCUMENTS

2014/0338613 A1* 11/2014 Suring ................. A01K 15/025
119/707

* cited by examiner

POP UP MOUSE CAT TOY

RELATED APPLICATIONS

There present application claims benefit of U.S. Provisional Patent Application No. 61/944,672 filed on Feb. 26, 2014 and incorporated by reference as if fully rewritten herein.

BACKGROUND OF THE INVENTION

1. Field of the Invention

The present invention relates to an animal plaything and more particularly, to a toy for cats.

2. Description of the Related Art

In practically every pet store, drug store and grocery store there may be purchased a wide variety of toys for either a cat or dog. Different types of balls, bones, toys which squeak, etc. can be purchased. In every case, each of the toys is passive. The only way that any of the toys can become movable is through the toy being thrown by a human being or upon the toy being moved by the animal itself.

Pet cats, however, are not as prone to interaction with a toy thrown by a human being. Cats are generally more restrictive in play and while of generally high intelligence, can not be confined in their behavior for repetitive manipulation of toys. Cats, more easily than most animals, tire of specific playthings once they have mastered them and act disdainfully of those that are too simple. Thus, there exists, the need for a pet toy which is simple in structure, yet durable and inexpensive and above all, continually challenging to the animal.

The present invention fulfills such a need.

Numerous examples exists that depict interactive toys for cats. For instance, U.S. Pat. No. 7,104,222, issued in the name of Tsengas, discloses a toy that includes a clear plastic ball to be readily movable along a supportive surface, such as the ground. Within the ball there is located a motorized character assembly. The character assembly has an upper housing cover in the form of a mouse or other rodent that would visually trigger an instinctive response in a cat or some breeds of (hunting) dogs. Beneath the upper housing cover is a motor which operates a drive wheel assembly. The drive wheel assembly is to be in continuous contact with the inner surface of the ball. The wheels further are made of soft rubber that does not slide in the internal ball surface, but rather causes the ball to roll and be propelled forward.

A toy made in accordance with this reference is associated with some drawbacks, the main of which is that it can become unconstrained in such a manner as to roll about a floor and across wide expanses such as to become lost or otherwise pose a nuisance to the pet owner.

Consequently, a need has therefore been felt for an improved and more static mechanism that still creates a chasable toy that triggers a play or chase response in a cat.

SUMMARY OF THE INVENTION

In accordance with the present invention, there is provided a plaything for cats which combines the dynamic of a chase with the physical as well as intellectual activity of the animal.

Briefly described according to a preferred embodiment of the present invention, a generally circular enclosure defining a generally circular track about which a prey decoy is located and travels. Openings or apertures in its housing permitting the prey decoy to travel about the track. The prey decoy is secured to a rotating wheel that imparts a rotary motion about the circular shaped track. The prey decoy is further spring urged in a vertical direction, perpendicular to the plane of rotational motion. The track opening has at least one break, making it noncontiguous. As the decoy is deployed about the track and impinges against the housing at the break in the track, the decoy is urged downward, and subsequently is urged upward when it reaches the track opening at the opposing side of the break. This circular motion in which the prey decoy appear to be moving upward and downward as it travels about the circular path stimulates the animal to paw at and engage the prey.

In an alternate embodiment, a plurality of prey decoys are provided that do not travel rotationally, but rather are urged upward or allowed to retract by the rotation of a circular cam. In such an embodiment, rather than a rotational dive and surface motion being emulated, the plurality of prey decoys appear in an up and down motion.

A more detailed description of the present invention are set forth in the following description. Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

Figure 1:
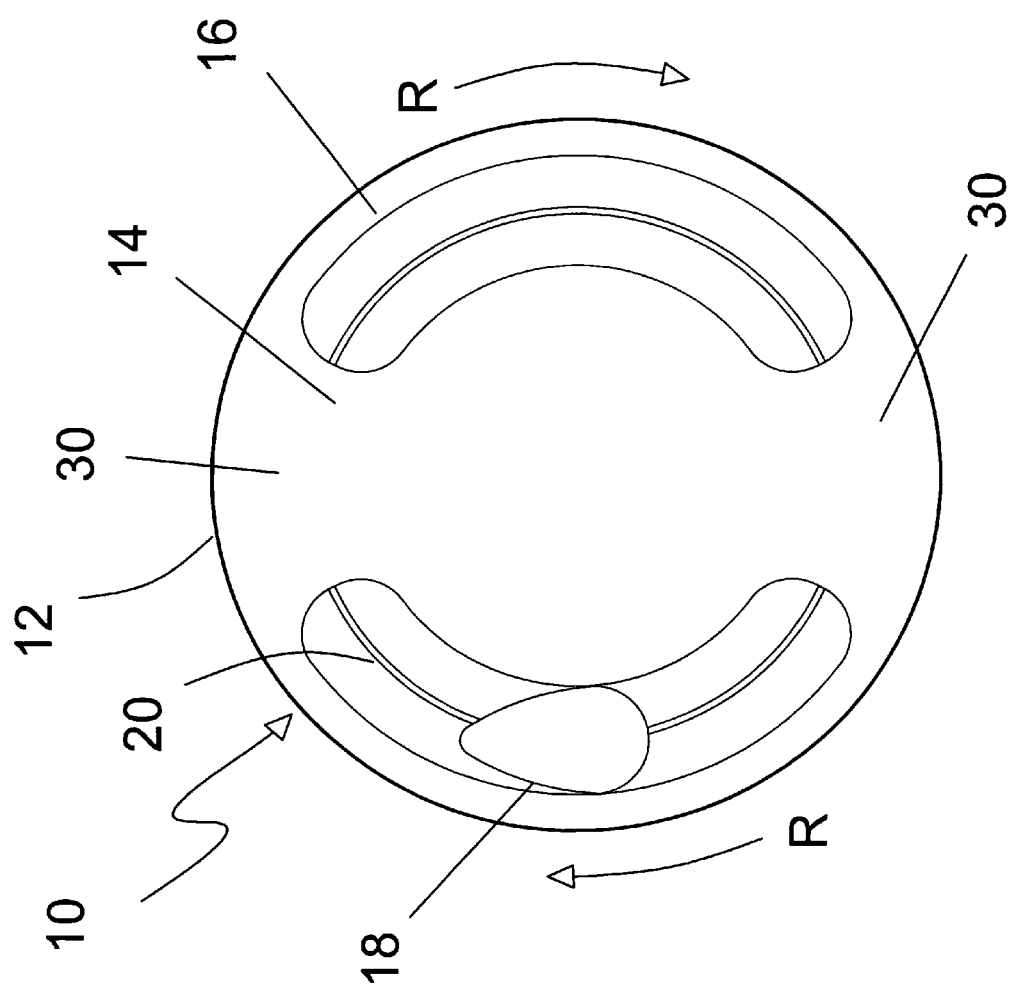
FIG. 1 depicts a top plan view of a pop up mouse cat toy according to a preferred embodiment of the present invention.
Figure 2:
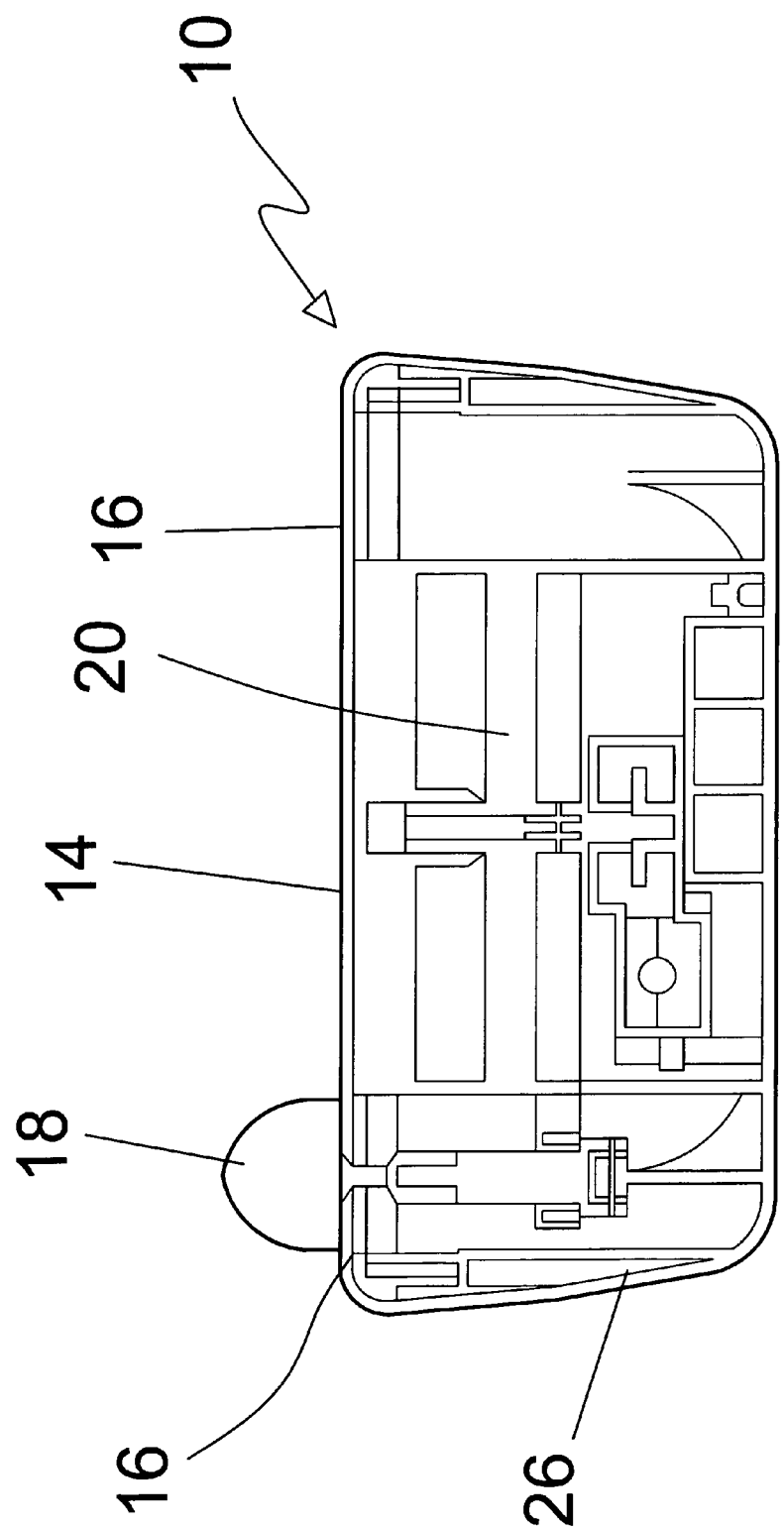
FIG. 2 is a cross sectional side elevational view taken along line II-II of FIG. 1.
Figure 3:
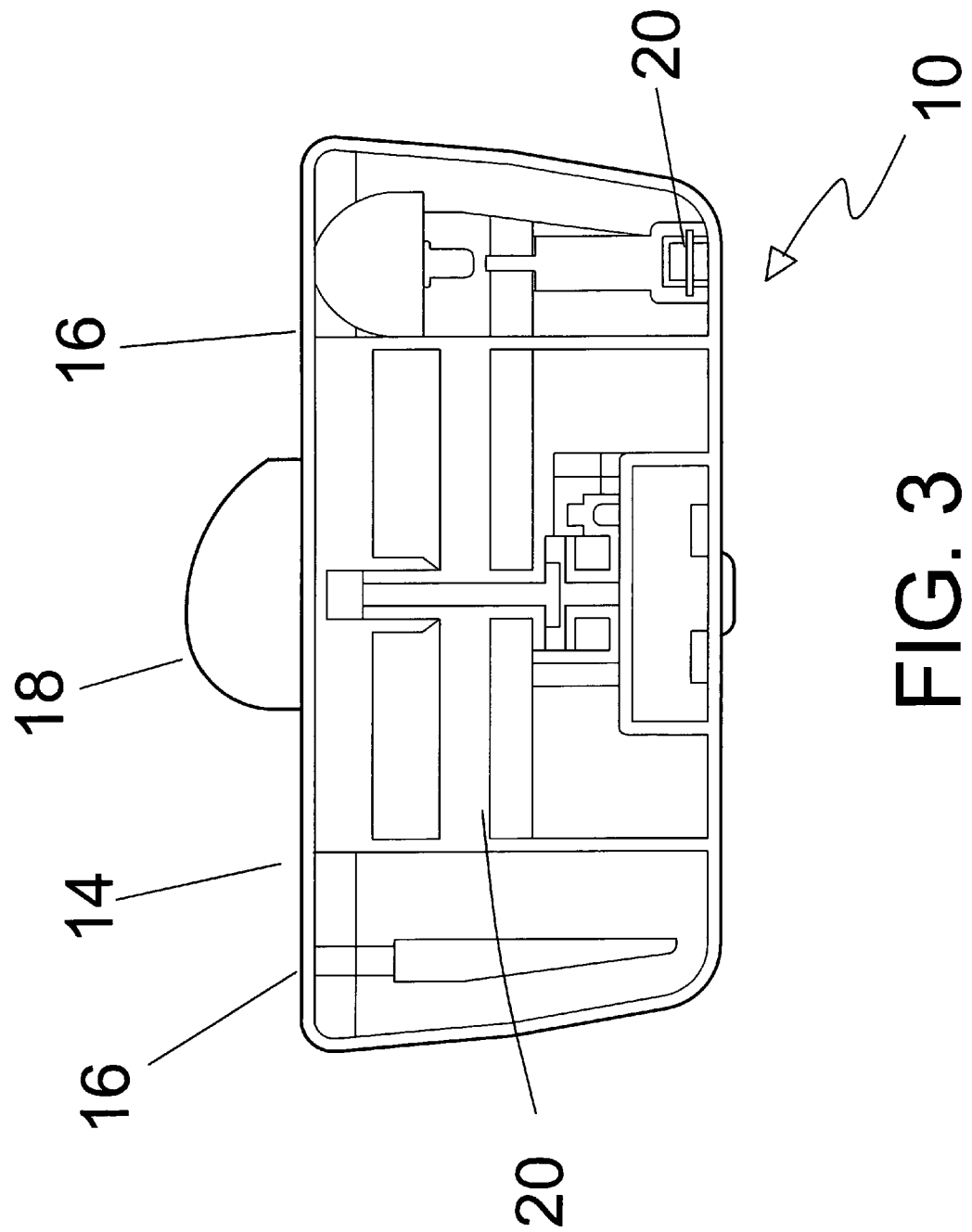
FIG. 3 is a cross sectional side elevational view taken along line III-III of FIG. 3.

Referring to FIG. 1-3, a pop up mouse cat toy, generally noted as 10, is shown according to the present invention. A generally circular or disc shaped housing or enclosure 12 is bounded by a generally flat upper top wall 14. The top wall 14 forms and defines a toroidal shaped track 16 about which a prey decoy 18 is located and travels.

For purposes of the present invention, the term "prey decoy" as indicated by element 18 should be broadly interpreted as any physical object that draws the attention of or attracts a targeted pet animal. Additionally, in a more narrow embodiment, the prey decoy 18 may be formed of a simulated mouse toy generally includes outer cover forming a mouse-like or rodent-like appearance. In an even more narrow embodiment, the prey decoy 18 further may have an internal cavity and sound chip assembly positioned in the interior cavity of outer cover. Such a more narrow prey decoy embodiment may further be formed of a Play-N-

Squeak® type motion activated sound generating pet toy as commercially provide by OurPet's® Company of Fairport Harbor, Ohio, and as further described at http://www.playnsqueak.com/products.html, as well as described by any of the following patent references that are incorporated by reference herein as if fully rewritten: U.S. Pat. Nos. 8,471,409; 6,371,0853; 8,196,551; and/or 6,559,426. Such Play-N-Squeak® type prey decoys generally comprise an outer cover fabricated from a relatively soft, yet durable, textile material with filling or stuffing and has the outward appearance of a mouse or other rodent or mouse-like rodent. A sound chip assembly housed inside includes a shaker barrel activator, a prerecorded sound chip and a source of electrical power, such as a battery. If desired, catnip can be placed in the interior cavity of outer cover and the catnip, along with the outward appearance of outer cover, will further attract pets, and especially cats.

The generally toroidal shaped track 15 about which the prey decoy 18 travels is formed of an openings or apertures 16 in its housing 10. The apertures 16 permit the prey decoy 18 to travel. The prey decoy 18 is secured to a rotating arm 20 that imparts a rotary motion about the toroidal shaped track 16. As the arm 20 rotates it is attached to a bigger radius cylinder with a smaller radius cylinder inside of the bigger cylinder. The smaller radius cylinder moves up and down inside the bigger radius cylinder according to the contours of the track, either higher or lower. The prey decoy is attached to the smaller radius cylinder though a spring. The prey decoy 18 is further spring urged by a connection spring 26 that connects the decoy 18 to the rotating arm 20 in a vertical direction "V", perpendicular to the plane of rotational motion "R". The track opening 16 has at least one break 30, making it noncontiguous. As the decoy 18 is deployed about the track 15 and impinges against the housing 12 at the break 30 in the track 16, the decoy 18 is urged downward, and subsequently is urged upward when it reaches the track opening 16 at the opposing side of the break 30. This circular motion in which the prey decoy 18 appear to be moving upward and downward as it travels about the circular path stimulates the animal to paw at and engage the prey.

Figure 4:
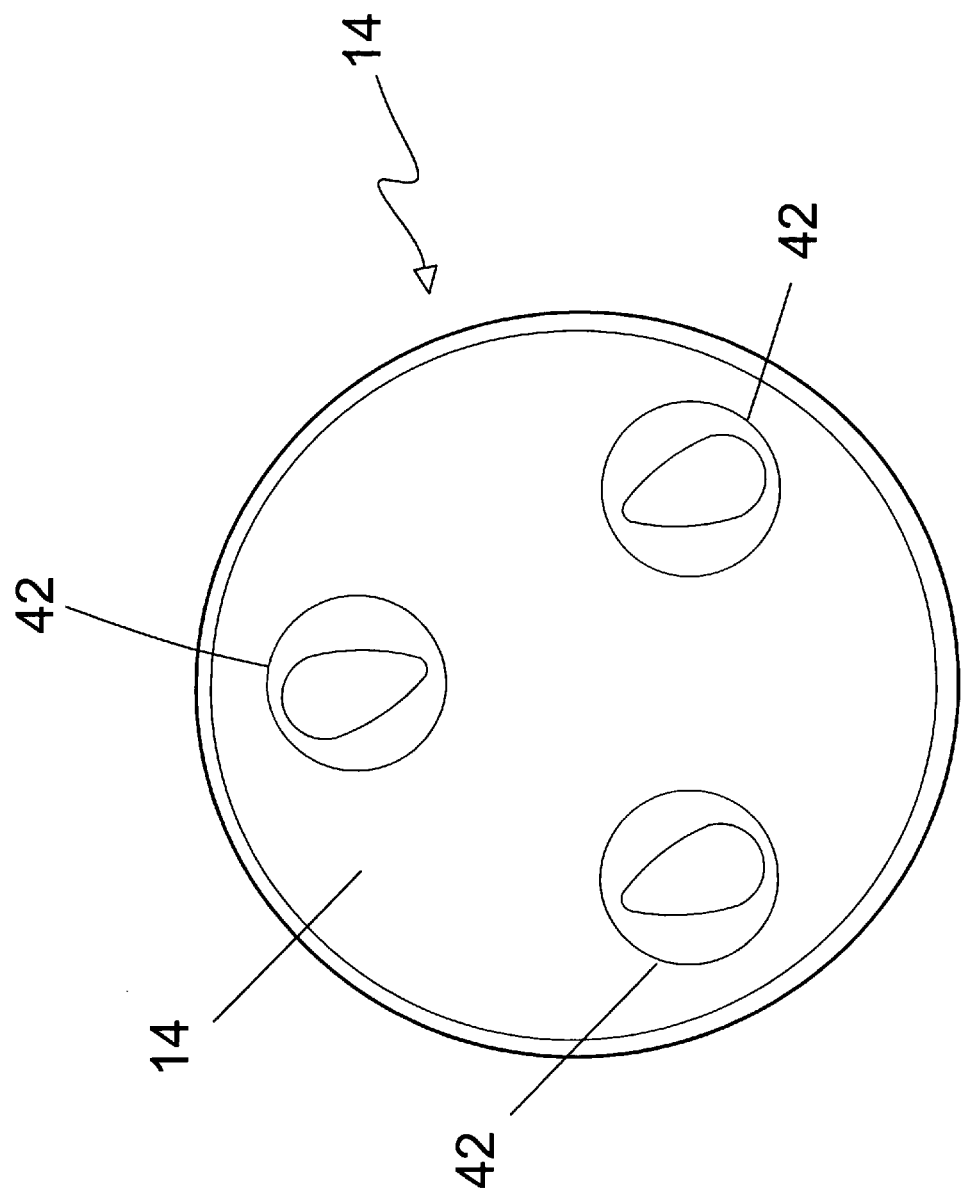
FIG. 4 depicts a top plan view of a pop up mouse cat toy according to a first alternate embodiment of the present invention.
Figure 5:
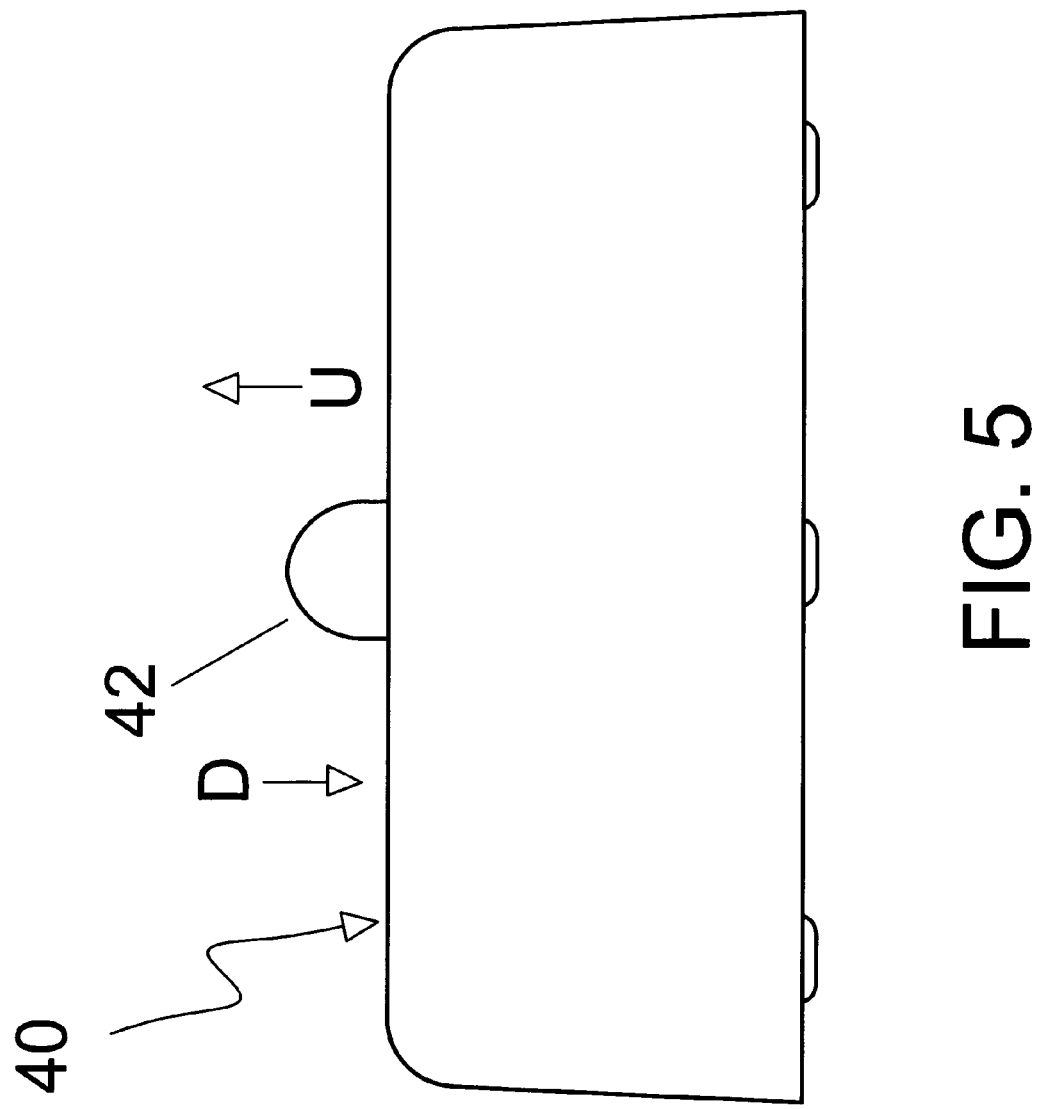
FIG. 5 is a front elevational view thereof.
Figure 6:
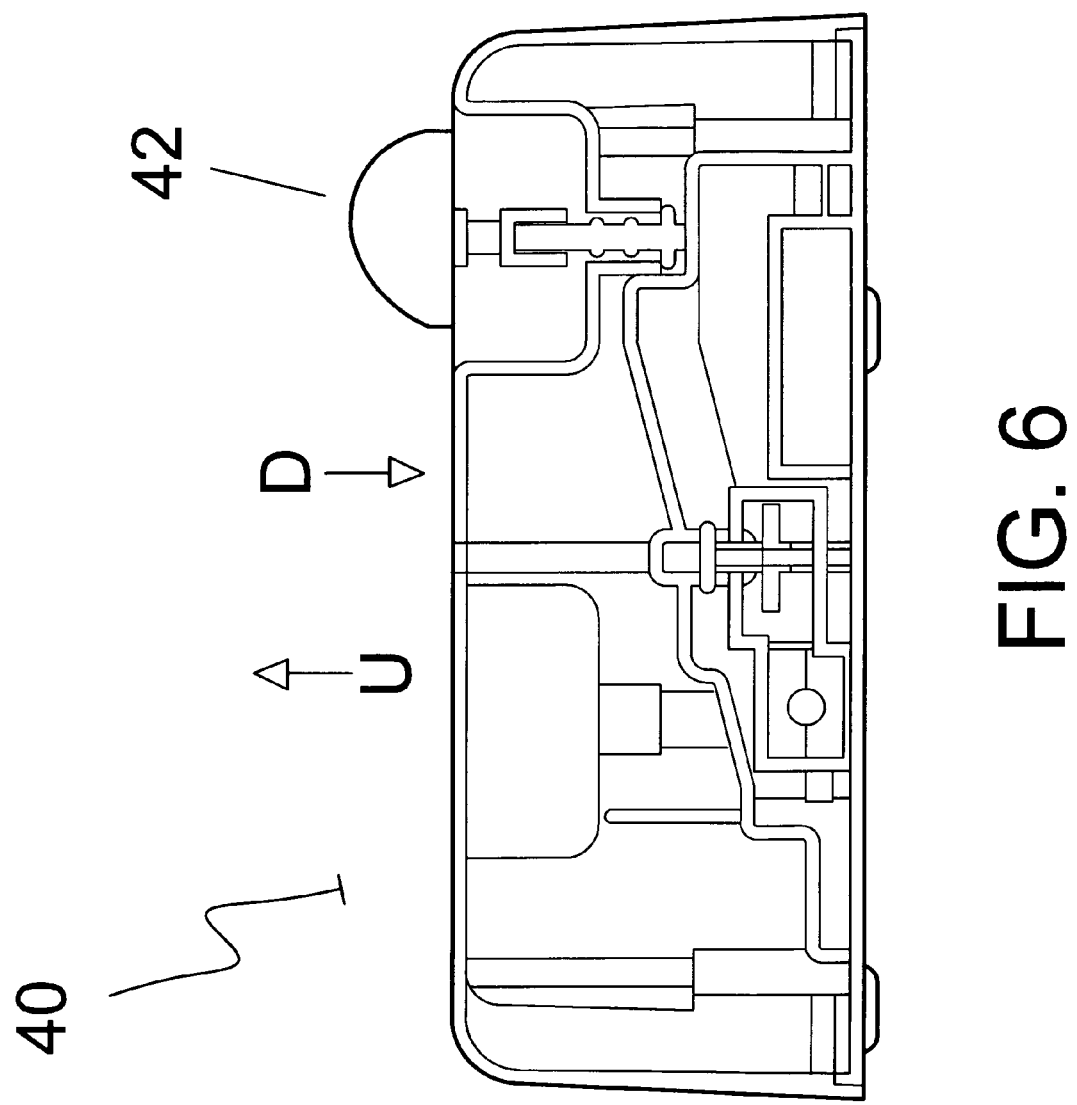
FIG. 6 is a cross sectional side elevational view taken along line VI-VI of FIG. 4.

Referring now to FIG. 4 through FIG. 6, an alternate embodiment of the present invent, generally noted a 40, is shown in which a variation in the housing 14 is provided to accommodate a plurality of prey decoys 42 that do not travel rotationally, but rather are urged upward "U" or allowed to retract downwardly "D" by the rotation of a circular disc 44 having one have disc higher than another. As the circular disc with one half of the disc higher than the other half rotates, the higher half provides an upward motion of the prey decoy. As the circular disc rotates then the decoy slides to the lower half of the circular disc, causing a downward motion of the prey. In such an embodiment, rather than a rotational dive and surface motion being emulated, the plurality of prey decoys 42 appear to present in an up and down motion.

It is to be understood, therefore, that numerous modifications of the toy of this invention may be made without departing from the spirit and scope of the embodiment described herein. Therefore, it is to be understood that this invention is not to be limited to the described embodiments thereof, except as defined in the appended claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A toy for cats comprising;
   a rotationally driven carousel for urging at least one connected prey decoy about a contiguous circuit;
   an outer stationary housing containing said carousel, said housing further forming at least one exit to allow physical communication of said prey decoy from under the housing and out from said housing;
   said prey decoy further being spring urged upward from said carousel in a vertical direction, perpendicular to a plane of said circuit;
   wherein as said carousel is rotated said driven prey decoy is urged about said circuit and outward from said housing as the driven prey decoy becomes aligned with said at least one exit and said driven prey decoy is urged downward below said housing as the driven prey decoy passed by said at least one exit, thereby creating motion such as to emulated said prey decoys appearing to run about in an up and down motion.

2. The toy of claim 1, wherein said carousel further comprises contiguous loop of track about which said prey decoy is rotated in a circular path.

3. The toy of claim 2, wherein said at least one exit further comprises
   arcuate shaped openings or apertures formed by an upper surface of said outer stationary housing and aligned coextensive with said circuit.

4. The toy of claim 1, further comprising a plurality of said arcuate shaped openings or apertures formed by said outer stationary housing wherein said openings or apertures are noncontiguous.

5. The toy for cats of claim 1, further comprising a plurality of prey decoys connected to said carousel and urged about said contiguous circuit.

6. The toy for cats of claim 3, further comprising a plurality of prey decoys connected to said carousel and urged about said contiguous circuit.

7. The toy for cats of claim 4, further comprising a plurality of prey decoys connected to said carousel and urged about said contiguous circuit.

8. The toy for cats of claim 3, wherein said prey decoy comprises a smooth oblong upper surface adapted to allow said decoy to pass beneath said upper surface in a manner that is responsive to and counteracts a spring urged upward force.

* * * * *